United States Patent
Mears

[11] Patent Number: 5,901,416
[45] Date of Patent: May 11, 1999

[54] RELEASABLE TIE STRAP

[76] Inventor: Arthur William Mears, 5529 Weld County Rd., #5, Erie, Colo. 80516

[21] Appl. No.: 09/042,222

[22] Filed: Mar. 13, 1998

Related U.S. Application Data

[60] Provisional application No. 60/040,521, Mar. 14, 1997.

[51] Int. Cl.$^6$ .................................................. B65D 63/00
[52] U.S. Cl. ................... 24/16 PB; 24/17 AP; 24/30.5 P
[58] Field of Search ............................... 24/16 PB, 17 AP, 24/30.5 P; 70/16, 17, 18; 292/317, 318

[56] References Cited

U.S. PATENT DOCUMENTS

| | | | |
|---|---|---|---|
| 4,008,512 | 2/1977 | Prodel | 24/16 PB |
| 4,047,268 | 9/1977 | Buttriss | 24/274 |
| 4,570,303 | 2/1986 | Richmond et al. | 24/16 |
| 4,572,466 | 2/1986 | Yamaguchi et al. | 248/73 |
| 4,958,414 | 9/1990 | Benoit | 24/17 AP |
| 4,993,669 | 2/1991 | Dyer | 248/61 |
| 5,181,402 | 1/1993 | Faessler | 70/18 |
| 5,271,127 | 12/1993 | Christensen | 24/16 |
| 5,346,311 | 9/1994 | Siler et al. | 383/75 |
| 5,377,510 | 1/1995 | Smith | 70/16 |
| 5,457,853 | 10/1995 | Klein | 24/16 PB |
| 5,511,288 | 4/1996 | McAndrews et al. | 24/16 |
| 5,524,463 | 6/1996 | Schenkel et al. | 24/16 PB |
| 5,544,391 | 8/1996 | Hoffman | 24/16 |

FOREIGN PATENT DOCUMENTS

| | | | |
|---|---|---|---|
| 1217470 | 12/1970 | United Kingdom | 24/16 PB |

*Primary Examiner*—Victor N. Sakran
*Attorney, Agent, or Firm*—Patent Law Offices of Rick Martin, P.C.

[57] ABSTRACT

The present invention discloses a releasable and reusable tie strap for bundling a group of wires together. A plastic tie strap has a clip head attached to the strap. The clip head has a hinged cover which can be releasably closed over the strap. The clip head has a ratchet tooth which engages ribs on the strap. The hinged cover is closed over the strap to cause the ratchet tooth to engage the ribs. The strap may then be drawn through the clip head to achieve the desired tightness around the object it is tying. The ratchet tooth prevents withdrawal of the strap from the clip head until the hinged cover is opened. Thus, the device may be opened and reused. Alternate embodiments utilize pins in lieu of the hinged cover.

13 Claims, 3 Drawing Sheets

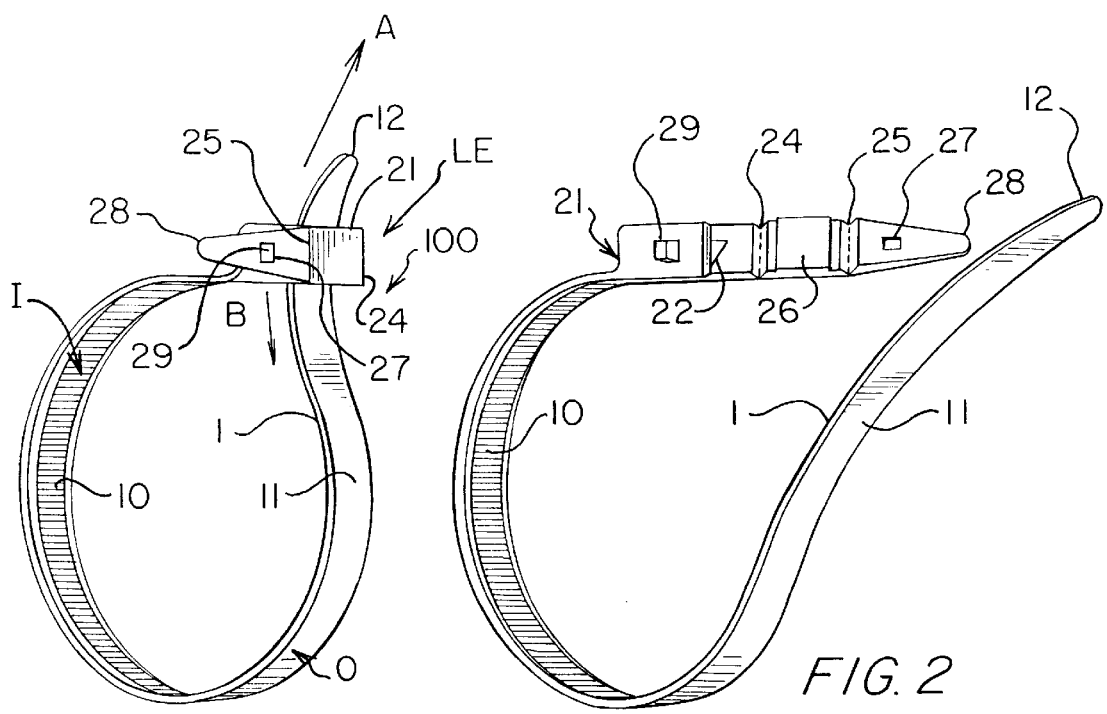
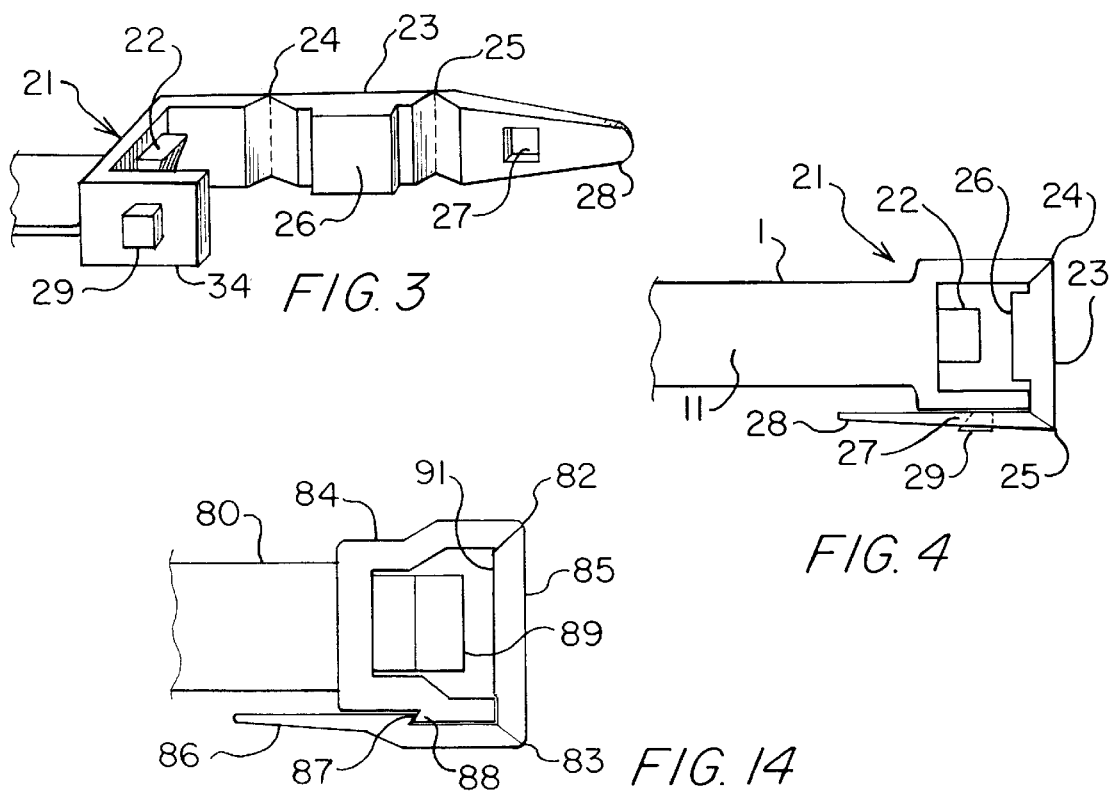

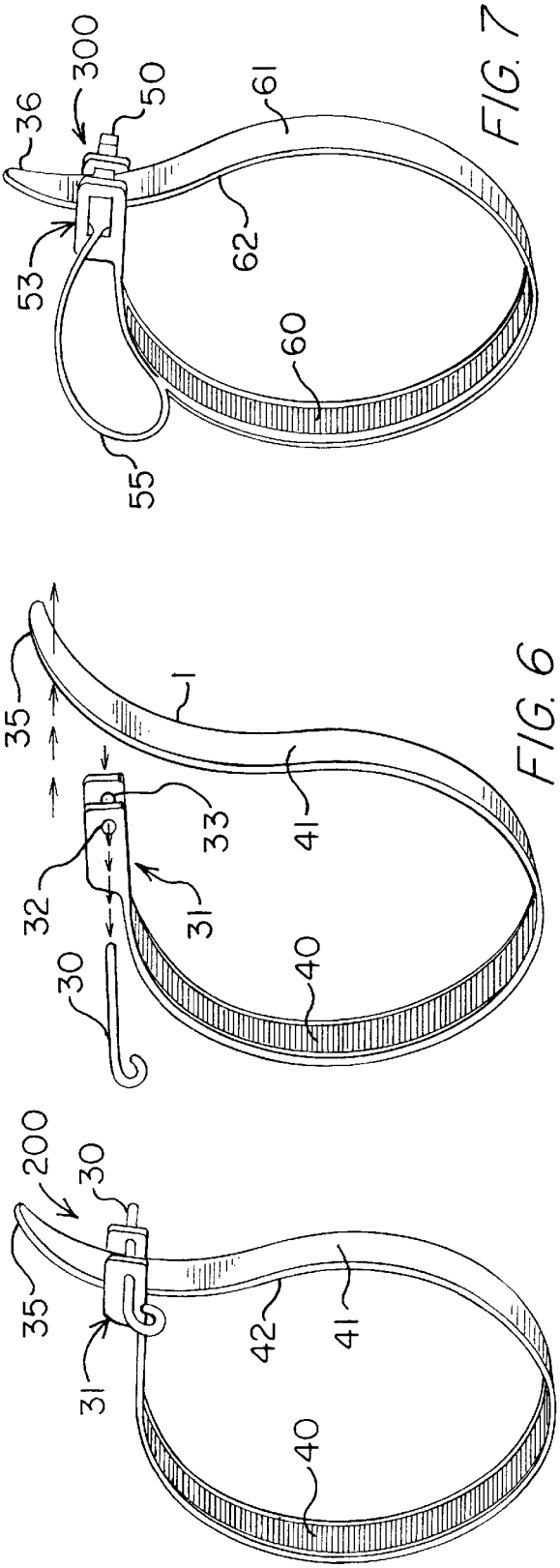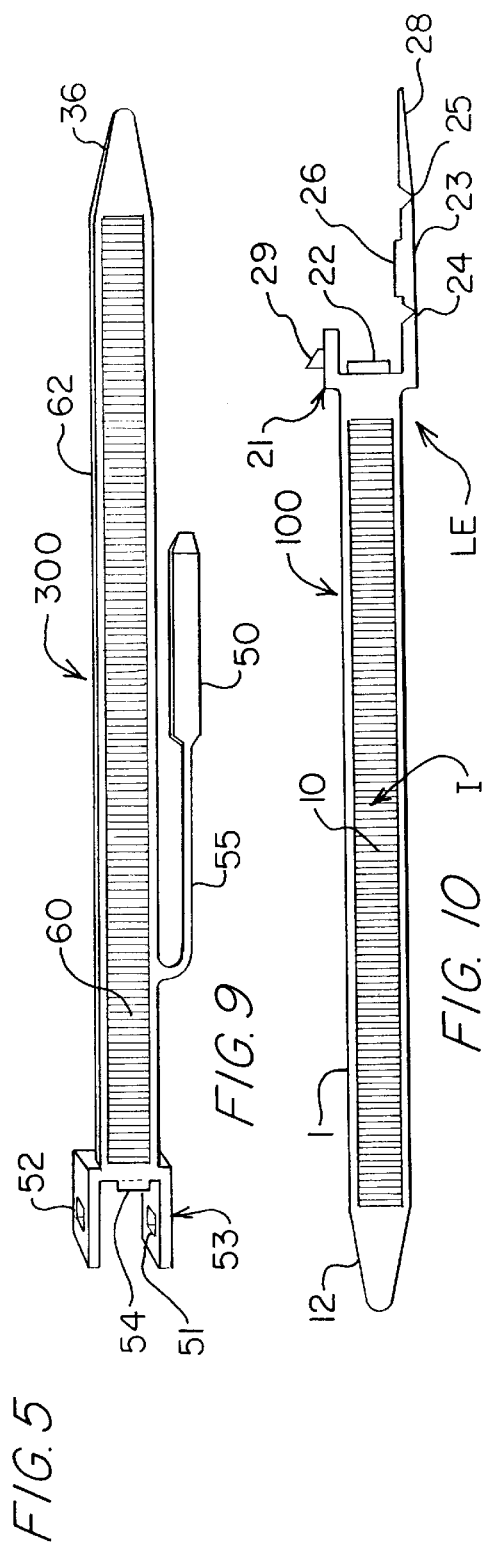

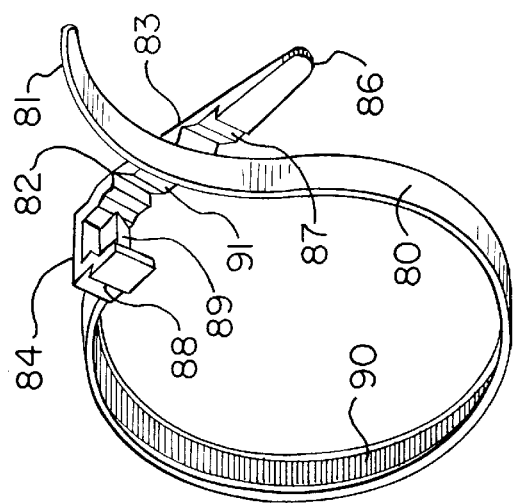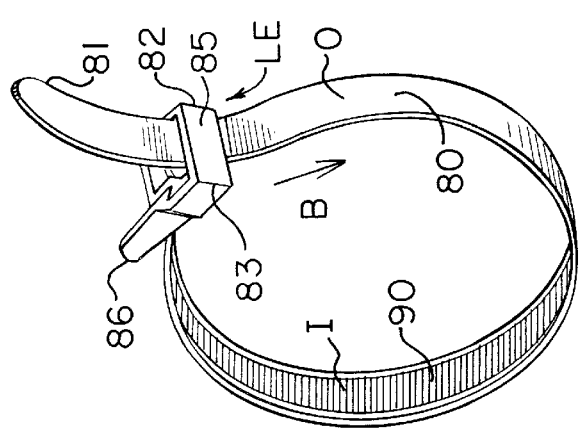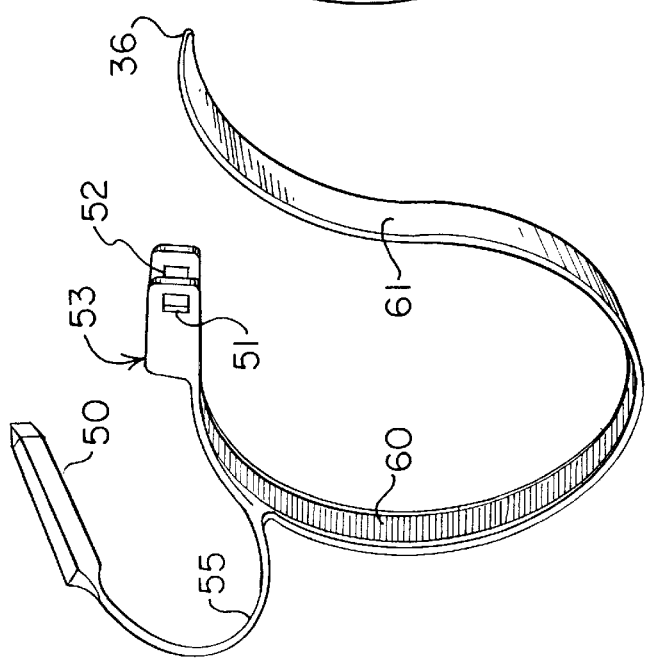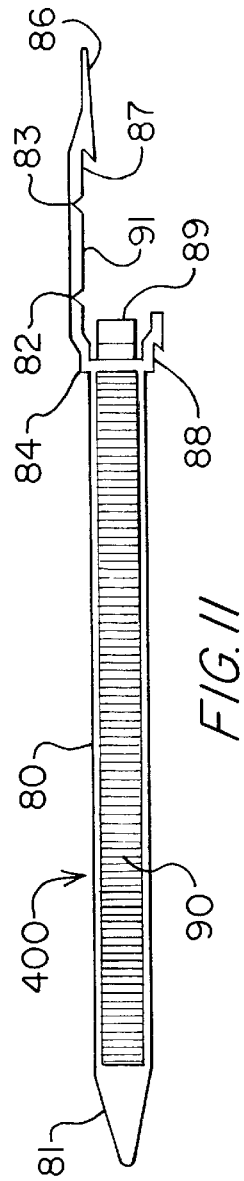

RELEASABLE TIE STRAP

CROSS-REFERENCE TO RELATED APPLICATIONS

Applicant claims the benefit of U.S. Provisional Application No. 60/040,521 filed Mar. 14, 1997.

FIELD OF INVENTION

The present invention relates to releasable cable ties also known as tie straps, in particular, reusable, flexible adjustable tie straps.

BACKGROUND OF THE INVENTION

Tie straps are widely known and used in industry. They are used for many purposes to combine or bundle objects together such as a bundle of wires.

Representative of the art is U.S. Pat. No. 5,377,510 (1995) to Smith which discloses a tie strap having a free end and a lock end. The lock end has a ratchet with a set of engagable teeth which engage teeth in the tie strap. The free end of the tie strap is threaded through the lock end to a desired tightness around the bundle to be tied. Security use for handcuffs is disclosed. For opening, a separate key is inserted in the lock end to release the ratchet thereby enabling the free end to be pulled out of the lock end.

Also representative is the releasable tab cable tie, U.S. Pat. No. 4,236,280, which discloses a cable tie having a tab for releasing the tie strap. A lock end has a tab with a ratchet tooth. The ratchet tooth engages ribs on the tie strap when in use. To release, the tab is rotated back on a hinge attached to the lock end causing the ratchet tooth to disengage from the ribs allowing the tie to be released and removed. This device requires both hands of the operator to release it when locked and it may slip when loaded in the operating position.

Other representative art is:

U.S. Pat. No. 5,544,391 (1996) to Hoffman discloses a tie head for use with elongated plastic strap.

U.S. Pat. No. 5,511,288 (1996) to McAndrews et al. discloses an adjustable loop clamp for improved retention of electrical cables, tubes, or hoses.

U.S. Pat. No. 5,271,127 (1993) to Christensen discloses a tie down device for securing a load.

U.S. Pat. No. 4,993,669 (1991) to Dyer discloses an improved cable or bundle tie arrangement including a plastic tip strap and a tie head.

U.S. Pat. No. 4,572,466 (1986) to Yamaguchi et al. discloses an anchor leg with an elongated projection and a resilient harness clip for engagement with a projection.

U.S. Pat. No. 4,570,303 (1986) to Richmond et al. discloses a clip for releasable attachment to a stud having a screw thread or annular ribs comprising a mount, which is elliptical in cross-section and has transverse flanges on its long sides to engage the thread or ribs of the stud.

U.S. Pat. No. 4,047,268 (1977) to Buttriss discloses a worm gear clamping apparatus including a molded, one-piece worm-gear drive head and strap assembly, the end of the strap oppositely disposed from the worm-gear drive head defining partial internal thread on its outward surface.

Generally, tie straps cannot be released and reused once they have been fastened. The prior art tie straps generally require the operator to use both hands to release the tie strap. They also tend to slip when under load. Further, tie straps which are releasable are generally complex and require a plurality of parts to function such as Smith's device noted above. Consequently, they are relatively expensive and are uneconomical for most repetitive use applications. The present invention addresses these shortcomings by supplying a finger-operated release head as an integral part of the lock end of a tie strap. It also provides a releasable tie strap which does not slip under pressure.

SUMMARY OF THE INVENTION

The primary aspect of the present invention is to provide a releasable tie strap.

Another aspect of the invention is to provide a reusable tie strap.

Another aspect of the invention is to provide an adjustable tie strap.

Another aspect of the invention is to provide an inexpensive tie strap.

Another aspect of the invention is to provide a tie strap having a clip head with a hinged cover.

Another aspect of the invention is to provide a clip head having a ratchet tooth to engage an elongated strap.

Other objects of this invention will appear from the following description and appended claims, reference being made to the accompanying drawings forming a part of this specification wherein like reference characters designate corresponding parts in the several views. The present invention addresses the problems in the prior art in that it can be released with one hand and it does not slip under the load when in use.

The present invention is a releasable tie strap which may be constructed of plastic or other similar material. The tie strap has an elongated flat strap with a free end and a lock end. The lock end has a releasable clip head. The elongated flat strap is two-sided. One side has a plurality of parallel ribs. The opposite side is smooth. The clip head comprises a ratchet tooth oriented in such a way so as to engage the ribbed side of the elongated strap when the free end is threaded through the lock end. A hinged cover is attached to one side of the clip head. The hinged cover has two parallel hinges which allows the hinged cover to be folded over the elongated strap. This causes the ribs on the elongated flat strap to engage the ratchet tooth. A tab located on the clip head opposite the hinged cover engages a hole in the end of the hinged cover to securely fasten the hinged cover to the clip head over the elongated flat strap.

To operate the tie strap, the user simply folds the hinged cover over the clip head to engage the tab with the hinged cover hole. The free end of the elongated flat strap is then inserted into and pulled through the clip head until the ribs engage the ratchet tooth. The user may then pull the elongated flat strap until the desired fastening effect is achieved.

To release the tie strap, the user simply pulls the end of the hinged cover away from the tab to disengage the hinged cover thereby releasing the elongated flat strap from the clip head.

BRIEF DESCRIPTION OF THE DRAWINGS

FIG. 1 is a perspective view of the preferred embodiment in the closed position.

FIG. 2 is a perspective view of the preferred embodiment in the released or open position.

FIG. 3 is a detailed perspective view of the clip head in the open position.

FIG. 4 is a side plan view of the clip head in the closed position.

FIG. 5 is a perspective view of a first alternate embodiment in the closed position.

FIG. 6 is a perspective view of the first alternate embodiment of FIG. 5 shown in the released or open position.

FIG. 7 is a perspective view of a second alternate embodiment in the closed position.

FIG. 8 is a perspective view of the second alternate embodiment of FIG. 7 shown in the released or open position.

FIG. 9 is a top perspective view of the second alternate embodiment of FIGS. 7, 8.

FIG. 10 is a plan view of the preferred embodiment of FIG. 1.

FIG. 11 is a front plan view of a third alternate embodiment.

FIG. 12 is a perspective view of a third alternate embodiment in the closed position.

FIG. 13 is a perspective view of the third alternate embodiment of the tie strap in the released or open position.

FIG. 14 is a detail of the clip head of the third alternate embodiment.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

FIG. 1 is a perspective view of the preferred embodiment in the closed position. The tie strap 100 comprises an elongated strap 1 with a clip head 21 at a lock end LE. Elongated strap 1 is preferably flat and two-sided. The inside I has a plurality of parallel ribs 10. Ribs 10 run the length of elongated strap 1. The outside O has a smooth surface 11. Hinge 24 and hinge 25 allow clip 28 to be folded over free end 12. Clip 28 is secured to tab 29 through hole 27 in clip 28. Free end 12 of elongated strap 1 is routed through clip head 21. Free end 12 is pulled in direction "A" to achieve the desired fastening effect. Ratchet tooth 22 (FIG. 3) engages ribs 10 preventing free end 12 from being pulled back through clip head 21 in direction "B".

FIG. 2 is a perspective view of the tie strap 100 in the released or open position. Clip head 21 comprises a hinged cover 23 which encloses elongated strap 1 when closed. Hinged cover 23 has hinge 24 and hinge 25. Between the hinges 24, 25 is locking surface 26 which restricts and controls the location of elongated strap 1 in clip head 21 in the closed position depicted in FIG. 1. Connected to hinge 25 is clip 28. Clip 28 further describes hole 27. Hole 27 engages tab 29 when the clip head 21 is in the closed position. Closing hinged cover 23 causes locking surface 26 to be positioned adjacent to ratchet tooth 22. Free end 12 of elongated strap 1 is routed between surface 26 and ratchet tooth 22. Ratchet tooth 22 engages ribs 10. Locking surface 26 contacts smooth surface 11. Locking surface 26 prevents elongated strap 1 and ribs 10 from disengaging from ratchet tooth 22.

FIG. 3 is a detailed perspective of the clip head 21 in the open position. Clip head 21 comprises a ratchet tooth 22 and a hinged cover 23. Hinged cover 23 attached to one side of ratchet tooth 22. Attached to the opposite side of ratchet tooth 22 is side 34. Tab 29 is attached opposite ratchet tooth 22 on side 34. Hinged cover 23 further comprises hinge 24 and hinge 25. Hinge 24 and hinge 25 consist of delta-shaped grooves cut in hinged cover 23 leaving just enough material in the center of the delta-shaped grooves to allow hinges 24, 25 to flex repeatedly. Between hinge 24 and hinge 25 is locking surface 26 which engages smooth surface 11 when the clip head 21 is in the closed position. Locking surface 26 forces ratchet tooth 22 to engage ribs 10. The end of hinged cover 23 comprises clip 28. Clip 28 has a hole 27 which engages tab 29 when the clip 28 is in the closed position.

FIG. 4 is a side plan view of the clip head 21 in the closed position. Hinged cover 23 is shown with hinge 24 and hinge 25 flexed 90°. Clip 28 engages tab 29 through hole 27. Elongated strap 1 is routed between ratchet tooth 22 and locking surface 26.

FIG. 5 is a perspective view of a first alternate embodiment, tie strap 200, in the closed position. The tie strap 200 comprises an elongated strap 42 having ribs 40 and a smooth surface 41. Ribs 40 run the length of elongated strap 42. Clip head 31 comprises a pin 30 which releasably engages clip head 31. In this embodiment pin 30 performs the same function as the locking surface 26 in FIG. 1. Pin 30 holds elongated strap 41 in such a position so as to cause ratchet tooth 22 to engage ribs 40.

FIG. 6 is a perspective view of the tie strap 200 in the released or open position. Pin 30 is shown removed from clip head 31. Pin 30 releasably engages clip head 31 through hole 32 and hole 33. Once pin 30 is removed, free end 35 may be released from clip head 31.

FIG. 7 is a perspective view of a second alternate embodiment, tie strap 300 in the closed position. The tie strap 300 comprises a clip head 53. Clip head 53 comprises a pin 50. Pin 50 is permanently attached to elongated strap 62 via tether 55 to prevent loss of pin 50 when the tie strap 300 is in the released or open position. To operate, pin 50 is inserted through hole 51 and hole 52. This forces ratchet tooth 22 to engage ribs 60. Ribs 60 run the length of elongated strap 62.

FIG. 8 is a perspective view of the tie strap 300 in the released or open position. Pin 50 is shown removed from hole 51 and hole 52. This allows free end 36 to be released and the tie strap 300 to be opened.

FIG. 9 is a top perspective view of the tie strap 300. The relative orientation of the component parts is shown. Pin 51 is attached to elongated strap 62 by tether 55. Clip head 53 is attached to elongated strap 62. Opposite clip head 53 is end 36. Ribs 60 are shown running the length of elongated strap 62.

FIG. 10 is a plan view of the preferred embodiment, tie strap 100. The relative orientation of the component parts is shown. Hinged cover 23 is attached to clip head 21. Clip head 21 is attached to elongated strap 1. Ribs 10 run the length of elongated strap 1. Free end 12 is opposite clip head 21.

FIG. 11 is a front plan view of a third alternate embodiment. The relative orientation of the component parts is shown. Hinged cover 85 is attached to clip head 84. Clip head 84 is attached to elongated strap 80. Ribs 90 run the length of elongated strap 80. Free end 81 is opposite clip head 84.

FIG. 12 is a perspective view of a third alternate embodiment in the closed position. The tie strap 400 comprises an elongated strap 80 with a clip head 84 at a lock end LE. Elongated strap 80 is preferably flat and two-sided. The inside I has a plurality of parallel ribs 90. Ribs 90 run the length of elongated strap 80. The outside O has a smooth surface. Hinge 82 and hinge 83 allow clip 85 to be folded over free end 81. Clip 86 is secured to interlocking tooth 88 with interlocking tooth 87. Free end 86 of elongated strap 80 is routed through clip head 84. Free end 81 is pulled in direction "A" to achieve the desired fastening effect. Ratchet tooth 89 engages ribs 90 preventing free end 81 from being pulled back through clip head 84 in direction "B".

FIG. 13 is a perspective view of the third alternate embodiment of the tie strap 400 in the released or open position. Clip head 84 comprises a hinged cover 85 which encloses elongated strap 80 when closed. Hinged cover 85 has hinge 82 and hinge 83. Between the hinges 82, 83 is locking surface 91 which restricts and controls the location of elongated strap 80 in clip head 84 in the closed position depicted in FIG. 12. Connected to hinge 83 is clip 86. Clip 86 further describes interlocking tooth 87. Interlocking tooth 87 engages interlocking tooth 88 when the clip head 84 is in the closed position. Closing hinged cover 85 causes locking surface 91 to be positioned adjacent to ratchet tooth 89. Free end 81 of elongated strap 80 is routed between surface 91 and ratchet tooth 89. Ratchet tooth 89 engages ribs 90. Locking surface 91 contacts smooth surface O. Locking surface 91 prevents elongated strap 80 and ribs 90 from disengaging from ratchet tooth 89.

FIG. 14 is a detail of the clip head. Hinged cover 85 is shown with hinge 82 and hinge 83 each flexed 90°. Interlocking tooth 88 interconnects with interlocking tooth 87. Elongated strap 80 is routed between ratchet tooth 89 and locking surface 91.

Although the present invention has been described with reference to preferred embodiments, numerous modifications and variations can be made and still the result will come within the scope of the invention. No limitation with respect to the specific embodiments disclosed herein is intended or should be inferred.

KEY

1. Elongated strap
2.
3.
4.
5.
6.
7.
8.
9.
10. Ribs
11. Smooth surface
12. Free end
13.
14.
15.
16.
17.
18.
19.
20.
21. Clip head
22. Ratchet tooth
23. Hinged cover
24. Hinge
25. Hinge
26. Locking surface
LE Lock end
I Inside
O Outside
27. Hole
28. Clip
29. Tab
30. Pin
31. Clip head
32. Hole
33. Hole
34. Side
35. End
36. End
40. Ribbed side
41. Smooth side
42. Elongated strap
50. Pin
51. Hole
52. Hole
53. Clip head
54. Ratchet tooth
55. Tether
60. Ribbed side
61. Smooth side
62. Elongated strap
100. Tie strap
200. Tie strap
300. Tie strap

I claim:

1. A releasable tie strap for circumferentially containing objects, comprising:

an elongated strap having a first and a second side;

said first side comprising a plurality of parallel ribs normal to a major axis;

a clip head attached to a lock end of said elongated strap;

said elongated strap having a free end releasably threadable through said clip head; and said clip head comprising a ratchet tooth and a hinged cover which releasably engages a tab, thereby releaseably engaging a rib with said ratchet tooth.

2. The releasable tie strap of claim 1, wherein said hinged cover further describes a hole at a distal end for releasably engaging a tab on said clip head; and wherein said hinged cover further comprises an interior surface which slidingly engages said second side.

3. The releasable tie strap in claim 2, wherein said second side further comprises a smooth surface.

4. The releasable tie strap of claim 3 composed of resilient flexible material.

5. The releasable tie strap of claim 4, wherein said hinged cover further comprises parallel hinges; and each hinge further comprises a flexible groove in said hinged cover.

6. The releasable tie strap of claim 1, wherein said hinged cover further describes a first interlocking tooth at a distal end for releasably engaging a second interlocking tooth on said clip head; and wherein said hinged cover further comprises an interior surface which slidingly engages said second side.

7. The releasable tie strap in claim 6, wherein said second side further comprises a smooth surface.

8. The releasable tie strap of claim 7, composed of resilient flexible material.

9. The releasable tie strap of claim 8, wherein said hinged cover further comprises parallel hinges; and each hinge further comprises a flexible groove in said hinged cover.

10. In a tying device of a type in which an elongated strap having a free end and a lock end and a ribbed first side and a smooth second side, wherein said free end is releasably threaded through the lock end, said lock end having a release mechanism, the improvement comprising:

the lock end having a hinged cover flexibly connected to a clip head formed to receive the free end, said hinged cover having a locking surface to releasably engage the ribbed side of the elongated strap against a fixed ratchet tooth, said hinged cover configured to move in a single plane of motion.

11. The tying device of claim 10, wherein said hinged cover further describes a hole; and wherein said clip head further comprises a tab which is releasably received by said hole.

12. The tying device of claim 10, wherein said hinged cover further describes a first interlocking tooth; and wherein said clip head further comprises a second interlocking tooth which is releasably received by said first interlocking tooth.

13. A releasable tie strap for circumferentially containing objects comprising:

an elongated strap having a first and a second side;

said first side comprising a plurality of parallel ribs normal to a major axis;

a clip head attached to a lock end of said elongated strap;

said elongated strap having a free end releasably threadable through said clip head; and said clip head comprising a ratchet tooth and a hinged cover which releasably engages a tab, thereby releaseably engaging a rib with said ratchet tooth;

said hinged cover being configured to move in a single plane.

* * * * *